Figure 3:
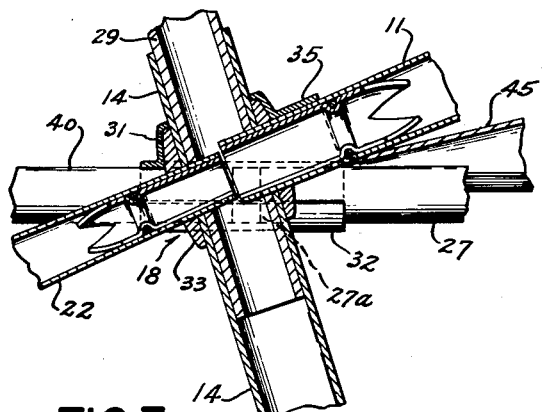

July 17, 1956 — A. P. DOUGLAS — 2,755,103
BICYCLE FRAME CONSTRUCTION
Filed March 9, 1953 — 2 Sheets-Sheet 1
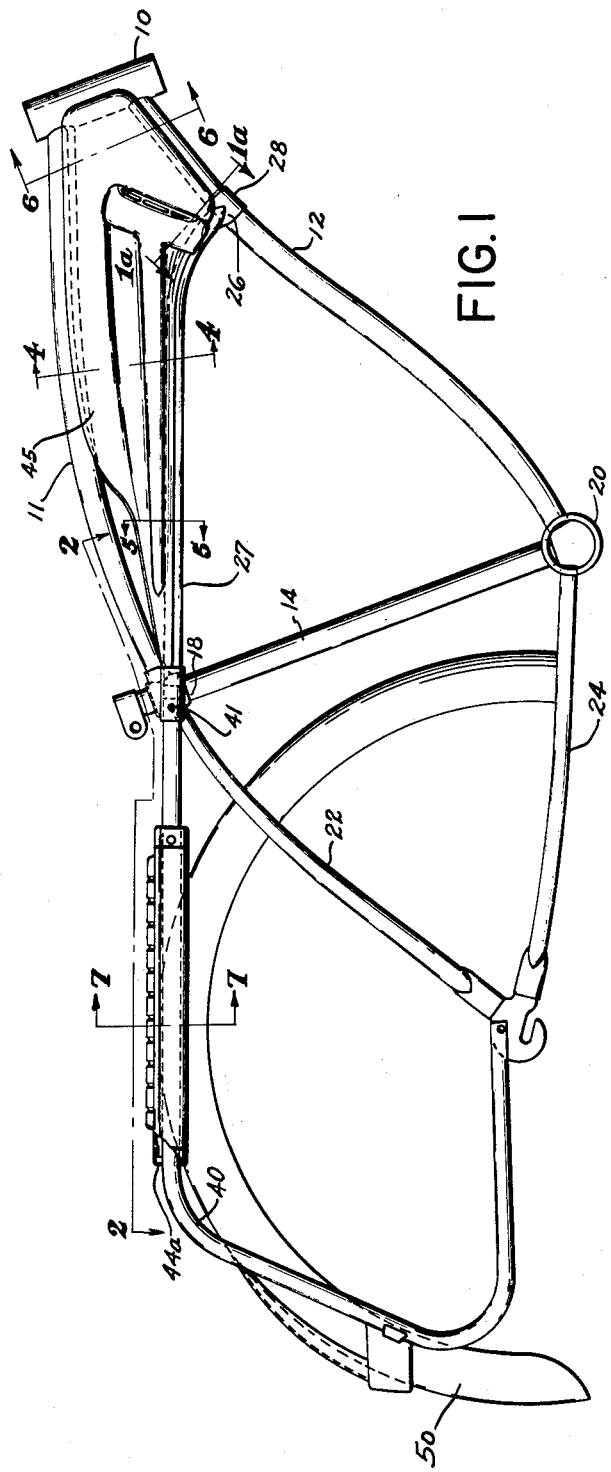
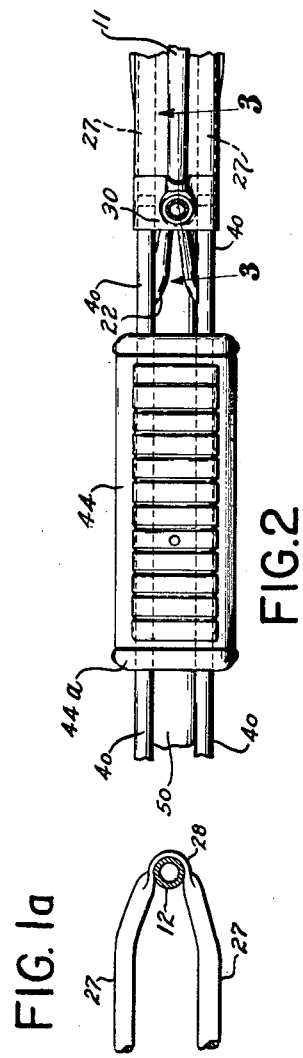
INVENTOR.
ALVIN P. DOUGLAS
BY Albert R. Golrick
ATTORNEY July 17, 1956   A. P. DOUGLAS   2,755,103
BICYCLE FRAME CONSTRUCTION
Filed March 9, 1953   2 Sheets-Sheet 2

INVENTOR.
ALVIN P. DOUGLAS
BY *Albert R. Golrick*

ATTORNEY

United States Patent Office 2,755,103
Patented July 17, 1956

2,755,103

BICYCLE FRAME CONSTRUCTION

Alvin P. Douglas, Cleveland, Ohio, assignor to The Murray Ohio Manufacturing Company, Cleveland, Ohio, a corporation of Ohio Application March 9, 1953, Serial No. 341,287

6 Claims. (Cl. 280—281)

This invention relates to bicycle frame constructions and the general object thereof is to produce a bicycle frame in which the load and stresses upon the top reach bar or tube are distributed in outrigger fashion to auxiliary bars or tube members secured strutwise to the seat post cluster structure and the forward part of the frame.

A still further object of the present invention is to provide outrigger frame bars attached to frame front and seat post cluster so as to overcome any tendency of a bicycle frame of conventional construction to weave or twist.

Another object of the present invention is the provision of a horizontal pair of spaced apart reach bars which will fulfill the strut function of the conventional secondary upper reach bar extending from the seat post cluster to the forward part of frame in such manner as to afford support for a tank attachment and rear luggage carrier attachment in a rugged manner.

A still further object is the provision of a novel seat post cluster structure having structural characteristics conducive to the attainment of the above stated objects.

Other objects and features will become apparent from the following description relating to the accompanying drawings which show the preferred construction as applied to bicycle frames. The essential characteristics are summarized in the claims.

In the drawings Figure 1 is a side elevation of a bicycle frame showing an attached tank and luggage carrier and incorporating the features of my invention; Fig. 1a is a cross sectional view taken along the plane indicated by the line 1a—1a in Fig. 1; Fig. 2 is a plan view of the carrier;

Fig. 3 is a cross sectional elevation taken through the seat post cluster construction substantially along the line 3—3 of Fig. 2.

Figure 4:
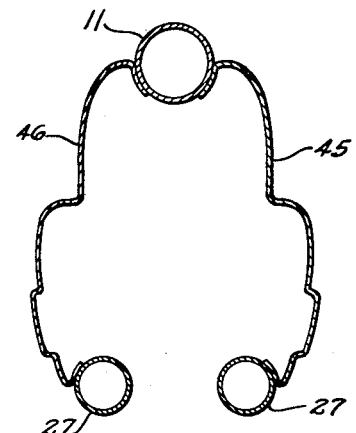
Figure 5:
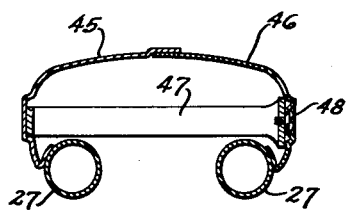
Figure 6:
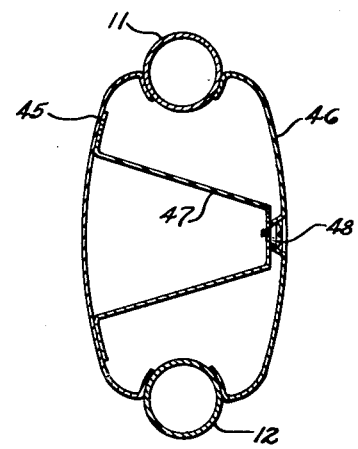
Figure 7:
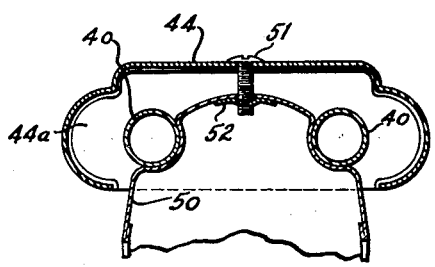

Figs. 4, 5 and 6 are transverse sections taken through the tank structure of the frame substantially along the lines 4—4, 5—5 and 6—6 respectively of Fig. 1, and Fig. 7 is a transverse section taken through the luggage carrier construction substantially along the line 7—7 of Fig. 1.

The present invention is concerned with increasing the strength of the upper part of bicycle frames wherein the frame structure heretofore comprised upper reach bars or tubes vertically spaced in a common plane, the uppermost of the two bars extended between the head tube or front fork bearing tube and the seat post cluster of the frame structure and the lower of the two tubes extended between the lower front reach bar frame adjacent the lower end of the head tube and the mast tube. Such a frame construction is generally disclosed in U. S. Patent 2,443,008. The construction therein shown had the advantage of being produced by brazing operations which have proven to be economically superior to production by various welding methods. However, some weaving tendency of the frame structure becomes manifest under certain conditions of use such as the attachment of power units on the frame or use by an unusually heavy rider.

I propose to stiffen the upper part of the frame construction by the use of outrigger tubes or bars in place of the conventional secondary upper reach bar in such manner that the outrigger bars may be firmly attached to the seat post cluster structure of the frame and serve as lateral or horizontal bracing struts between the front part of the frame structure and the seat post cluster structure and I accomplish the foregoing while retaining the advantages of the brazed frame structure disclosed in said Patent 2,443,008 and also gain the advantage of a simple, rugged attachment for rear luggage carrier frame bars which may or may not be attached to the bicycle as desired.

In the drawings in Fig. 1, I show the incorporation of the idea in a bicycle frame comprising a fork bearing or head tube 10, a front upper reach bar 11, a lower front reach bar 12, a seat post mast tube 14, the upper and lower bars 11 and 12 being connected at the rear ends thereof respectively to a seat post cluster structure designated generally by the reference numeral 18 and to the hanger bearing tube 20. A seat post receiving ferrule 29 is fitted into the upper end of the mast tube 14 and constitutes part of the cluster structure. Rear upper fork tubes 22 connected to the seat post cluster structure 18 and lower rear fork members 24 connect to the hanger tube 20 and to each other preferably in the manner disclosed in said Patent 2,443,008, i. e. the joints are so constructed as to permit of a simultaneous copper brazing of the tubes 11, 14, 22 and 29 and to a thick walled tubular member 33 in an atmospherically controlled furnace.

The outrigger reinforcement comprises preferably a tubular structure consisting of a single tube flattened and shaped in a press and bent at the flattened part 26 into a U shape to provide two spaced apart legs 27. The curvature of the U bend 28 on the inside conforms to and snugly fits upon the outer surface of the front lower reach bar 12 adjacent the lower end of the head tube. The legs of the U shape are also bent, at a point above the locus of connection to tube 12, to extend outwardly and rearwardly and then parallel in a substantially horizontal plane passing through the seat post cluster structure 18 where the ends terminate.

The means of attachment of the rear ends of the outrigger tubes 27 are so constructed at the seat post cluster as to be spaced a substantial distance from the mast post center line and also is so constructed as to be incorporated in the cluster structure simultaneously with the effecting of the joint brazing of the other connections of the frame structure, referring to Fig. 3, which shows the cluster construction disclosed in U. S. Patent 2,491,379 but modified to some extent for the purposes of this invention. To this end I have devised a socket construction which will embrace the upper part of the cluster structure so as to be firmly brazed thereto at the time the cluster joints are brazed. This construction comprises a steel plate member 30 of relatively heavy gauge having a drawn and perforated central portion 31 and a socket formation 32 at each side of the drawn and perforated portion and which sockets are spaced outwardly from the mast tube the required distance of the desired horizontal spacing of the outrigger tubes 27. The plate structure projects front and back of the mast tube 14, the central forward part, having a substantially half round or less formation 35 to rest upon and contact over a considerable area the top side of the upper reach bar 11. Thus this socket plate rests upon the perimeter of the upper end of the barrel shaped tubular member 33 of the cluster construction with the seat mast or tube 14 also centering the socket member along with the reach bar engaging formation 35 serving to align the socket formations 32 parallel with the reach bar structure of the frame at the time the copper brazing of all frame joints is effected. It is to be understood that also the forward U formation of the outrigger tubes 27 will be brazed to the front lower reach bar at the time all brazing of the various frame joints is simultaneously effected.

It will be noted that the outrigger tube ends 27a terminate adjacent a transverse plane passing through the mast tube center thus leaving the rear half of the socket formations for the reception of the forward ends of parallel luggage bars 40. Securing means such as screws 41 serve to firmly retain the luggage bar ends in the socket formations.

Apart from the advantage of adding lateral rigidity to the frame by the use of the outrigger tubes 27 as disclosed other advantages flow from the construction. The appearance of the bicycle is considerably enhanced particularly when a luggage carrier, as disclosed, is used since the tube lines 27—40 of frame and carrier appear to be continuous from front to rear of the bicycle. The luggage frame tubes 40 pass through end flange structures 44a of a stamped luggage carrier 44 forming a load bearing for the carrier. The rear wheel guard 50 may be attached to the under side of the carrier between the tubes, as shown in Fig. 7 by a bolt 51 and spring nut 52. Also, ready attachment and support for a battery carrying tank is afforded and the tank may of of economical construction comprising a right and left drawn stampings 45—46 of ornamented sheet metal held in three point bearing relation to the top reach bar tube —and the lower outrigger tubes 27 by brackets 11 and brackets and screws 48. Also, it will be obvious that a more stable mounting for a suspended power unit is afforded by the two laterally spaced apart outrigger tubes.

To those skilled in the art the importance of a proper braze or bonding of the outrigger tube socket attaching means to the elements of the seat post cluster is apparent. The barrel fitting part 31 and the upper front reach bar fitting part 35 of the formation are in snug relation so that the copper brazing operation assures a practical integrality of the tube and supporting means with the seat post cluster structure. To the same extent the flattened, bent part 26—28 of the tubes embraces the front lower reach bar 12 and all of which is accomplished in the main brazing process of uniting all of the parts constituting the bicycle frame structure.

I claim:

1. In a seat post cluster structure for a conventional bicycle frame wherein the cluster comprises at least four tube parts connected together, said cluster including an auxiliary tube supporting means in the form of a socket structure adapted to support the rear ends of two horizontally spaced apart auxiliary tubes terminating at the cluster structure at each side of the seat post tube and in outwardly spaced relation thereto, said socket structure being secured to at least two of the tube parts of the cluster and shaped to afford sockets for the auxiliary tube ends, said auxiliary tube sockets being continuous from front to rear of the cluster structure whereby the forward ends of rearwardly extending luggage carrier tubes may be attachably secured in the socket formation.

2. In a seat post cluster structure for a conventional bicycle frame wherein the cluster comprises at least four tube parts connected together, including an auxiliary socket means adapted to support the rear ends of two horizontally spaced apart auxiliary tubes terminating at each side of the seat post tube in outwardly spaced relation thereto, said means being shaped to afford sockets for the auxiliary tube ends, said auxiliary tube sockets being continuous from front to rear of the cluster structure, rearwardly extending luggage carrier tubes having the forward ends thereof secured in said auxiliary tube sockets, said luggage carrier tubes comprising the two spaced apart tubes shaped in parallel to extend from forward socket connected ends thereof a horizontal distance to support a luggage rack rearwardly of the seat post cluster structure, then curved downwardly to an attachment with the rear wheel mounting of the frame structure.

3. In a seat post cluster structure for a conventional bicycle frame wherein the cluster comprises five tube parts brazed together and comprising a seat mast tube, an annular member surrounding the upper part of the mast tube and transverse socket connections of the upper rear fork members and the upper front reach bar, an auxiliary tube supporting socket means adapted to support the rear ends of two horizontally spaced apart auxiliary tubes terminating at each side of the seat post tube in outwardly spaced relation to said cluster structure, said socket means being shaped to afford sockets for the auxiliary tube ends, said auxiliary tube sockets being continuous from front to rear of the cluster structure and said supporting socket means being shaped to engage and be secured to the upper front reach bar and the said annular member.

4. In a bicycle frame construction a luggage carrier attachment comprising a pair of tubular members shaped to extend rearwardly from the seat post cluster structure of the frame and then downwardly spanning the rear wheel guard to securement location at rear axle plates of the frame, said tubes being parallel throughout their length and surmounted by a luggage platform or saddle having a downwardly extending end flange structure bearing upon the tubes, and a socket structure secured to the seat post cluster structure in the sockets of which the ends of the tubular members are secured.

5. In a bicycle frame construction a luggage carrier attachment comprising a pair of tubular members shaped to extend rearwardly from the seat post cluster structure of the frame and then downwardly spanning the rear wheel guard to securement location at rear axle plates of the frame, said tubes being parallel throughout their length and surmounted by a luggage platform or saddle having a downwardly extending end flange structure bearing upon the tubes, a rear wheel guard in abutment with the tubes, and a socket structure secured to the seat post cluster structure in the sockets of which the ends of the tubular members are secured, and means for attaching the rear wheel mud guard structure to the platform structure.

6. In a conventional bicycle frame structure having a seat post cluster structure and a lower front reach bar, two parallel spaced apart outrigger tubular parts comprising a single tube bent into a U shape and flattened at the bend with the flattened bend fitted about and secured to the lower front reach bar, said parts extending upwardly and outwardly and then rearwardly from the flattened bend in a horizontal plane and terminating at the seat post cluster structure, said cluster structure having socket formations into which extend the rear ends of said parts of the bent tube.

References Cited in the file of this patent

UNITED STATES PATENTS

| | | | |
|---|---|---|---|
| D. 100,958 | Mankki | Aug. | 25, 1936 |
| D. 170,169 | Schreckengost | Aug. | 11, 1953 |
| 1,260,937 | Muller | Mar. | 26, 1918 |
| 1,955,797 | Clark | Mar. | 26, 1935 |
| 2,080,677 | Uber | May | 18, 1937 |
| 2,151,533 | Schwinn | May | 21, 1939 |
| 2,491,379 | Kraeft et al. | Dec. | 13, 1949 |
| 2,531,902 | Baron | Nov. | 28, 1950 |
| 2,579,097 | Schwinn | Dec. | 18, 1951 |

FOREIGN PATENTS

| | | | |
|---|---|---|---|
| 858,050 | France | May | 6, 1940 |
| 112,997 | Sweden | Jan. | 23, 1945 |